US012584734B2

(12) United States Patent
Ogawa et al.

(10) Patent No.: US 12,584,734 B2
(45) Date of Patent: Mar. 24, 2026

(54) AUTOMATIC MEASURING DEVICE AND CONTROL METHOD OF THE SAME

(71) Applicant: MITUTOYO CORPORATION, Kanagawa (JP)

(72) Inventors: Keita Ogawa, Kanagawa (JP); Shuji Hayashida, Kanagawa (JP); Masashi Yamaji, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 335 days.

(21) Appl. No.: 18/226,968

(22) Filed: Jul. 27, 2023

(65) Prior Publication Data

US 2024/0035816 A1     Feb. 1, 2024

(30) Foreign Application Priority Data

Jul. 29, 2022     (JP) ................................. 2022-122096

(51) Int. Cl.
*G01B 21/04*     (2006.01)
*G01B 3/00*     (2006.01)
*G01B 3/18*     (2006.01)

(52) U.S. Cl.
CPC ........... *G01B 21/047* (2013.01); *G01B 3/008* (2013.01); *G01B 3/18* (2013.01)

(58) Field of Classification Search
CPC ........ G01B 21/047; G01B 3/008; G01B 3/18; G01B 5/008; G01B 21/00; G01B 21/04
See application file for complete search history.

(56) References Cited

U.S. PATENT DOCUMENTS

| | | | | | |
|---|---|---|---|---|---|
| 11,466,971 | B2 * | 10/2022 | Yamaji | ..................... | G01B 5/02 |
| 11,522,232 | B2 * | 12/2022 | Kahn | ........................ | G01B 3/18 |
| 11,788,826 | B2 * | 10/2023 | Boyd | ..................... | G01B 5/012 |
| | | | | | 33/559 |
| 12,159,981 | B2 * | 12/2024 | Kahn | ..................... | G01B 21/32 |
| 12,392,595 | B2 * | 8/2025 | Yamaji | ..................... | G01B 5/10 |

(Continued)

FOREIGN PATENT DOCUMENTS

| | | |
|---|---|---|
| JP | H08-14871 | 1/1996 |
| JP | H10-89903 | 4/1998 |
| JP | 2019-100904 | 6/2019 |

*Primary Examiner* — Yaritza Guadalupe-Mccall

(74) *Attorney, Agent, or Firm* — Greenblum & Bernstein, P.L.C.

(57)     ABSTRACT

An automatic measuring device includes a micrometer including a spindle that moves forward and backward to be brought into contact with or away from a workpiece and a displacement detector unit that detects displacement of the spindle, and an automatic operation unit that automates the forward and backward movement of the spindle by power. The automatic operation unit performs a first forward-movement step of moving the spindle forward to bring the spindle into contact with the workpiece, and a contact determination step of determining the contact between the spindle and the workpiece in the first forward-movement step. In the contact determination step, the spindle is determined to be in contact with the workpiece when a change in a position of the spindle detected by the displacement detector unit in the first forward-movement step becomes equal to or less than a predetermined contact determination threshold.

7 Claims, 10 Drawing Sheets

(56)     References Cited

U.S. PATENT DOCUMENTS

| 2016/0018218 | A1* | 1/2016 | Nakagawa | G01B 5/008 |
| | | | | 33/503 |
| 2021/0237733 | A1* | 8/2021 | Oue | F02D 29/02 |
| 2023/0304785 | A1* | 9/2023 | Ogawa | G01B 7/016 |
| 2024/0035816 | A1* | 2/2024 | Ogawa | G01B 3/18 |
| 2024/0151506 | A1* | 5/2024 | Takatsu | B25J 9/1679 |
| 2024/0263932 | A1* | 8/2024 | Yamaji | G01B 5/02 |
| 2024/0345116 | A1* | 10/2024 | Sasaki | G01B 5/12 |
| 2025/0076019 | A1* | 3/2025 | Yamaji | G01B 5/06 |
| 2025/0076021 | A1* | 3/2025 | Yamaji | G01B 7/02 |
| 2025/0174744 | A1* | 5/2025 | Kahn | G01B 21/10 |

* cited by examiner

AUTOMATIC MEASURING DEVICE AND CONTROL METHOD OF THE SAME

INCORPORATION BY REFERENCE

This application is based upon and claims the benefit of priority from JP patent application No. 2022-122096, filed on Jul. 29, 2022 (DAS code 29AF), the disclosure of which is incorporated herein in its entirety by reference.

BACKGROUND OF THE PRESENT INVENTION

Field of the Present Invention

The present invention relates to an automatic measuring device that automatically measures a workpiece using a small-sized measuring machine for measuring a dimension of the workpiece and a control method of the automatic measuring device.

Description of Related Art

Micrometers and calipers are known as measuring machines (measuring tools) for measuring a dimension of a workpiece. Such contact-type measuring machines (measuring tools) are widely used because of their advantages, such as ease of use, measurement stability, and relatively low cost. However, in order to measure a workpiece, it is required for the workpiece and a movable element (spindle or measuring jaw) to be in proper close contact and for the same measurement pressure to be constantly applied, which inevitably results in manual measurement. Therefore, measurement with such a contact-type measuring machine is time-consuming and labor intensive.

As an alternative to manual measurement, non-contact measuring machines, such as air micrometers and laser scan micrometers, have been proposed for use at production sites (JP H08-014871 A). However, air micrometers and laser scan micrometers are themselves extremely expensive and difficult to maintain.

Patent Literature 1: JP H10-89903 A
Patent Literature 2: JP2019-100904 A
Patent Literature 3: JP H08-14871 A

SUMMARY OF THE PRESENT INVENTION

Although various proposals have been made to automate contact measurement, such as those using motor power, there have been no cases of successful practical applications that have been widely used by the general public (JP H10-089903 A). In addition, it is possible to automate contact measurement by using a coordinate measuring machine (CMM) or the like (JP 2019-100904 A), but it requires an investment of tens to hundreds of millions of yen, which is not appropriate to use a CMM as a substitute for measurement using a micrometer or caliper.

A purpose of the present invention is to provide an automatic measuring device that automates an inexpensive and easy-to-use contact-type measuring machine and a control method of the automatic measuring device.

A control method of an automatic measuring device according to an embodiment of the present invention, the automatic measuring device including:

a measuring machine that includes a movable element provided to be displaceable with respect to a fixed element and moves forward and backward to be brought into contact with or away from a workpiece to measure a dimension of the workpiece, and a displacement detector unit that detects displacement of the movable element; and an automatic operation unit that automates the forward and backward movement of the movable element by power, the automatic measuring device being configured to automatically measure the workpiece using the measuring machine, the control method includes:

a first forward-movement step of moving, by the automatic operation unit, the movable element forward to bring the movable element into contact with the workpiece; and a contact determination step of determining the contact between the movable element and the workpiece in the first forward-movement step, in which the contact determination step includes determining that the movable element is in contact with the workpiece when a change in a position of the movable element detected by the displacement detector unit in the first forward-movement step becomes equal to or less than a predetermined contact determination threshold.

In an embodiment of the present invention, it is preferable that the control method further includes:

a first backward-movement step of moving, by the automatic operation unit, the movable element backward by a predetermined amount when the movable element is determined to be in contact with the workpiece in the contact determination step; and a re-forward-movement step of moving, by the automatic operation unit, the movable element forward again to generate a predetermined measurement pressure between the workpiece and the movable element.

In an embodiment of the present invention, it is preferable that the automatic measuring device further includes a constant pressure mechanism in a path through which the power is transmitted from the automatic operation unit to the movable element to prevent a force equal to or greater than a predetermined load from being applied from the movable element to the workpiece when a preset load is applied to the movable element, and the movable element is determined to be in contact with the workpiece in the contact determination step when the forward movement of the movable element is stopped by activation of the constant pressure mechanism in the first forward-movement step and the change in the position of the movable element detected by the displacement detector unit becomes equal to or less than the contact determination threshold.

In an embodiment of the present invention, it is preferable that the movable element and the workpiece are determined to be in contact in the contact determination step when the change in the position of the movable element detected by the displacement detector unit in the first forward-movement step becoming equal to or less than the contact determination threshold is confirmed a plurality of consecutive times.

In an embodiment of the present invention, it is preferable that a first target point is set with a slight margin over a workpiece dimension based on information about the workpiece, and the first forward-movement step includes:

a first high-speed forward-movement step of moving the movable element at a relatively high speed to the first target point; and a first low-speed forward-movement step of moving the movable element at a speed lower than the speed in the first high-speed forward-movement step after the movable element reaches the first target point.

In an embodiment of the present invention, it is preferable that the automatic measuring device further includes a holding unit that holds at least one of the workpiece and the measuring machine to bring a contact surface of the workpiece and a contact surface of the movable element into close contact by changing a relative position and posture between the workpiece and the movable element with a pressure equal to or less than a predetermined measurement pressure preset in the measuring machine when the workpiece and the movable element are brought into contact with each other, and the holding unit allows the workpiece and the measuring machine to change the relative posture in the first forward-movement step, using a direction intersecting a measuring axis of the measuring machine as a rotation axis.

An automatic measuring device according to an embodiment of the present invention includes:

a measuring machine that includes a movable element provided to be displaceable with respect to a fixed element and moves forward and backward to be brought into contact with or away from a workpiece, and a displacement detector unit that detects displacement of the movable element; and an automatic operation unit that automates the forward and backward movement of the movable element by power, the automatic measuring device being configured to automatically measure the workpiece using the measuring machine, in which the automatic operation unit performs:

a first forward-movement step of moving the movable element forward to bring the movable element into contact with the workpiece;

a contact determination step of determining the contact between the movable element and the workpiece in the first forward-movement step;

a first backward-movement step of moving the movable element backward by a predetermined amount when the movable element is determined to be in contact with the workpiece in the contact determination step; and a re-forward-movement step of moving the movable element forward again to generate a predetermined measurement pressure between the workpiece and the movable element, and the contact determination step includes determining that the movable element is in contact with the workpiece when a change in a position of the movable element detected by the displacement detector unit in the first forward-movement step becomes equal to or less than a predetermined contact determination threshold.

DETAILED DESCRIPTION

Figure 1:
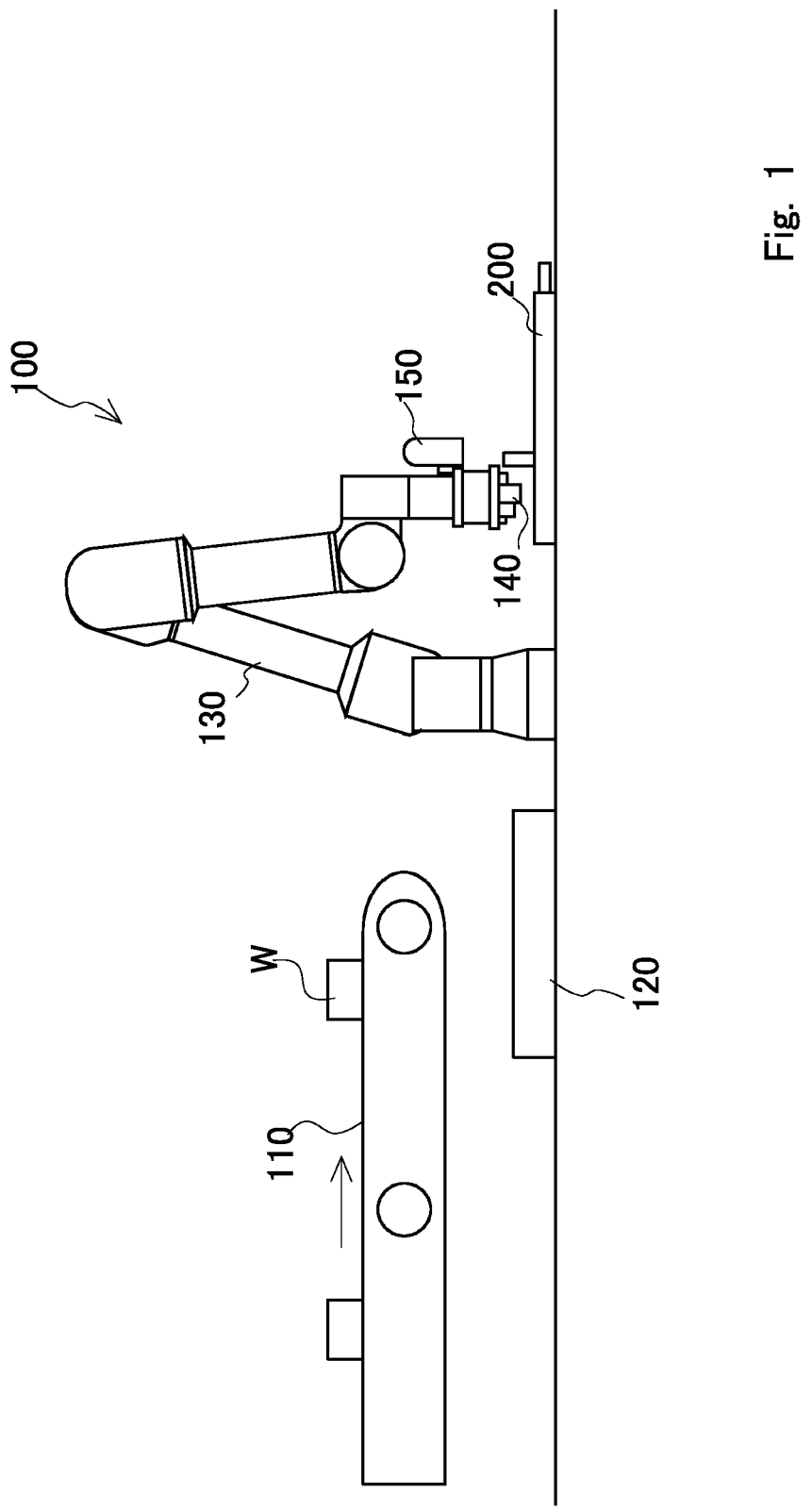
FIG. 1 is an overall configuration of an automatic measurement system.

Embodiments of the present invention are illustrated and described with reference to the reference signs assigned to the elements in the drawings.

First Exemplary Embodiment

A first exemplary embodiment of the present invention is described below.

FIG. 1 is an overall configuration of an automatic measurement system 100.

A workpiece W (for example, a part) machined by a machine tool (for example, a numeric control (NC) lathe) is conveyed by a conveyor belt 110. The workpiece W is transferred to a stocker 120 for pretreatment. As pretreatment, deoiling and dust removal by air blow may be performed. The pretreated workpiece W is carried by a robot arm 130 into a measurement area of an automatic measuring device 200. The robot arm 130 is an articulated robot arm 130 and includes a robot hand 140 for grasping the workpiece W at its tip and a camera 150 for image recognition. The robot arm 130 recognizes the workpiece W by image recognition, grasps the workpiece W with the robot hand 140, and conveys the workpiece W to the measurement area of the automatic measuring device 200. Here, the robot hand 140 is assumed to place the workpiece W in a preset orientation (posture) in the measurement area and once release the workpiece W.

For a simpler system, a person may manually pick up and transfer the workpiece W.

The workpiece W conveyed to the measurement area in this manner is measured for its dimension by the automatic measuring device 200.

The automatic measuring device 200 is an automated micrometer 300 as a small-sized measuring machine (small-sized measuring tool) and is referred to as an automatic micrometer device.

Figure 2:
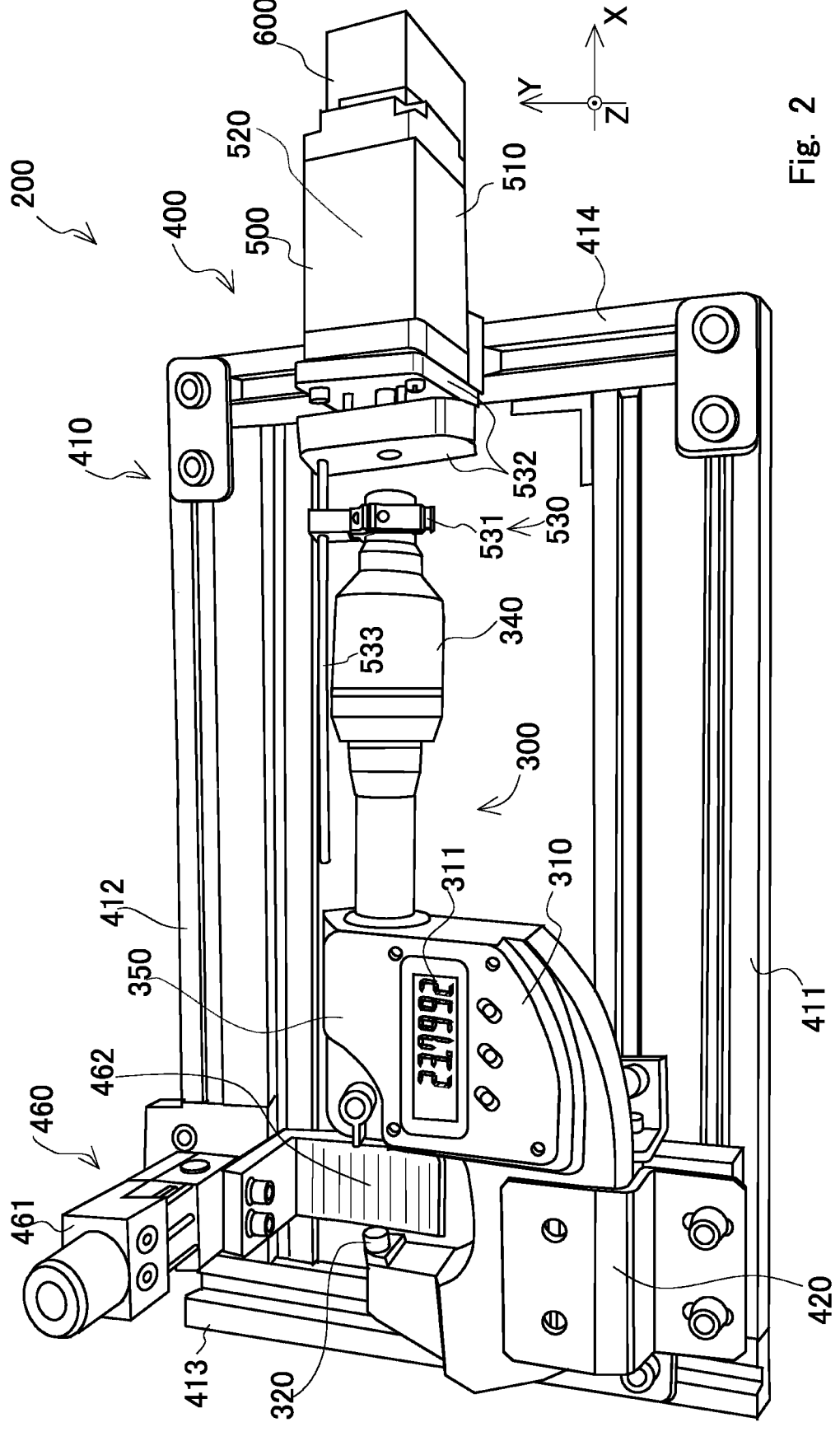
FIG. 2 is an external view of an automatic micrometer device.

FIG. 2 is an external view of the automatic micrometer device 200.

The automatic micrometer device 200 includes a micrometer (measuring machine) 300, a measuring-machine supporting base part 400, a workpiece holding base part 460, and an automatic operation unit 500.

The micrometer 300 is originally a small-sized, manually operated measuring machine, and a commercially available micrometer 300 can be used as the micrometer 300 in the present embodiment.

The configuration of the micrometer 300 is briefly described below.

The micrometer 300 includes a U-shaped frame (fixed element) 310, a spindle (movable element) 330, a thimble 340, and a displacement detector unit 350.

The U-shaped frame 310 includes an anvil 320 inside one end of the U-shape.

The spindle 330 is provided at the other end of the U-shaped frame 310 and is axially movable forward and backward with respect to the anvil 320. The spindle 330 is provided with a measuring surface on one end face of the spindle 330 to be brought into contact with the workpiece W. Similarly, the anvil 320 is provided with a measuring surface on the other end face of the anvil 320 to be brought into contact with the workpiece W. The measuring surfaces are machined into flat surfaces and formed of cemented carbide material or ceramic. The spindle 330 is fed and moved axially forward and backward by the rotary operation of the thimble 340. The axis along which the spindle 330 moves forward and backward is referred to as a measurement axis.

There are two types of methods for feeding the spindle 330: a rotary feed type in which the spindle 330 itself rotates, and a linear feed type in which the spindle 330 itself does not rotate. In the rotary feed type, the spindle 330 is provided with a male thread, and the U-shaped frame 310 is provided with a female thread. The thimble 340 and the spindle 330 are engaged to rotate together, and the spindle 330 is rotated by the rotary operation of the thimble 340. Then, the spindle 330 moves forward or backward by the screw feed. In the linear feed type, a feed screw is provided inside the thimble 340, and the spindle 330 is provided with a pin that engages with the feed screw. When the thimble 340 is rotated while the spindle 330 is locked, the spindle 330 is fed by the engagement between the pin and the feed screw. The type of the micrometer 300 to be employed in the present embodiment can be either the rotary feed type or the linear feed type.

The thimble 340 is disposed at the other end of the spindle 330 at the other end of the U-shaped frame 310. The thimble 340 is an operation unit that moves the spindle 330 forward and backward by rotary operation.

The micrometer 300 to be employed in the present embodiment preferably includes a constant pressure mechanism 341 (FIG. 3) between the thimble 340 and the spindle 330. The constant pressure mechanism 341 disengages the thimble 340 and the spindle 330 when a preset load is applied to the spindle 330, thereby causing the thimble 340 to idle (slide) against the spindle 330. By constantly activating the constant pressure mechanism 341 in the same proper manner during measurement, the measurement pressure during measurement can be kept constant, and the measurement accuracy (repeatability) can be kept high. The constant pressure mechanism 341 is incorporated in commercially available micrometers 300 and is disclosed in JP 3115555 B, JP 3724995 B, JP 5426459 B, and JP 5270223 B. The constant pressure mechanism 341 can be constituted by a ratchet mechanism that allows slippage to occur when a force above a predetermined load is applied between the thimble 340 and the spindle 330, or a plate spring interposed between an outer sleeve and an inner sleeve of the thimble 340 to allow slippage to occur above a predetermined load.

Not only micrometers, but also calipers including such a constant pressure mechanism are known, and those with a constant pressure mechanism (ratchet mechanism) between a thumb roller and a slider are known (JP 6857090 B, JP 6559848 B, and JP 5095155 B).

The micrometer 300 to be employed in the present embodiment may include a measurement-pressure detection mechanism that detects the load applied to the spindle 330. For example, such a measurement-pressure detection mechanism is disclosed in JP 3751540 B, JP 4806545 B, and JP 2019-190916 A. The measurement-pressure detection mechanism may directly or indirectly detect the load applied to the spindle 330 with a strain gauge or the like, or may detect that the load applied to the spindle 330 has reached a predetermined value by the activation of the constant pressure mechanism 341. The measurement-pressure detection mechanism outputs a signal (measurement pressure signal) when detecting a predetermined measurement pressure. For example, the displacement detector unit 350 may perform sampling (latching) of a measurement value (displacement) in response to the detection of the predetermined measurement pressure by the measurement-pressure detection mechanism.

In the present embodiment, the movable element (spindle) is controlled to move forward and backward in order for the constant pressure mechanism 341 to activate reliably, and a measurement value is sampled when the constant pressure mechanism 341 is activated by a measurement-pressure application step (ST173) described below and it is determined that the measurement pressure is properly applied. Therefore, the measurement-pressure detection mechanism may or may not be provided in the present embodiment.

The displacement detector unit 350 detects the displacement (or position) of the spindle 330. The displacement detector unit 350 is constituted by a rotary encoder or linear encoder.

The displacement detector unit 350 may be an analog type (scale type) instead of an encoder. In this case, for automation, the scale may be read by a digital camera or the like, and a measurement value may be read by image analysis (image recognition). In this case, the displacement detector unit 350 may be constituted by an analog-type scale, a digital camera, and an image recognition unit (image analysis unit).

In addition, the U-shaped frame 310 includes a display panel unit 311 for displaying a measurement value and switches for operation on its front face. The U-shaped frame 310 further has a measurement value output function that outputs the measurement value externally via wired or wireless communication as a function of a built-in electric circuit.

Next, the measuring-machine supporting base part 400 is described. The measuring-machine supporting base part 400 includes a base frame 410 and a measuring-machine holding unit 420.

The base frame 410 is an overall rectangular frame. For the sake of explanation, mutually orthogonal XYZ coordinate axes are taken as shown in FIG. 2. Of the four sides constituting the base frame 410, the two sides parallel to the X axis direction are a first long side part 411 and a second long side part 412, and the two sides parallel to the Y axis direction are a first short side part 413 and a second short side part 414.

The first and second long side parts 411 and 412 and the first and second short side parts 413 and 414 are desirably stretchable to adjust their length. This allows the size of the base frame 410 to be adjusted according to the size of the micrometer 300 and workpiece W.

The measuring-machine holding unit 420 is installed on the first long side part 411, the automatic operation unit 500 is installed on the second short side part 414, and the workpiece holding base part 460 is installed on the second long side part 412. The first long side part 411 has a rail to allow the installation position of the measuring-machine holding unit 420 to be adjusted along the X-axis direction. Similarly, the second short side part 414 has a rail to allow the installation position of the automatic operation unit 500 to be adjusted along the Y-axis direction. The second long side part 412 has a rail to allow the installation position of the workpiece holding base part 460 to be adjusted along the X-axis direction.

The measuring-machine holding unit 420 is fixedly attached to the first long side part 411. The measuring-machine holding unit 420 is a retaining plate. The retaining plate retains the U-shaped frame (fixing element) 310 of the micrometer (measuring machine) 300 inserted between the first long side part 411 and the retaining plate in such a manner as to attach the micrometer (measuring machine) 300 to the base frame 410. The orientation of the micrometer 300 is as follows: the forward/backward movement direction (axial direction) of the spindle 330 is parallel to the X axis, the one end side (anvil 320 side) of the U-shaped frame 310 faces the first short side part 413, and the other end side (thimble side) of the U-shaped frame 310 faces the second short side part 414.

Next, the workpiece holding base part 460 is described. The workpiece holding base part 460 holds the workpiece W to be measured in the measurement area of the micrometer (measuring machine) 300. The workpiece holding base part 460 includes a supporting column 461 and a workpiece placing plate 462. The supporting column 461 is attached to the first long side part 411. The workpiece placing plate 462 is an L-shaped plate having a plane parallel to the XY plane and is fixed to the supporting column 461. The position of the supporting column 461 is adjusted along the second long side part 412 in order for the workpiece W held by the workpiece holding base part 460 to be in the measurement area of the micrometer (measuring machine) 300, and the height (position in the Z-axis direction) of the workpiece placing plate 462 is adjusted in order for a part to be measured of the workpiece W to be sandwiched between the anvil 320 and the spindle 330.

The surface of the workpiece placing plate 462 on which the workpiece W is placed is flat, and the workpiece W placed on and held by this placing surface easily changes its position and posture when pushed by the spindle 330. In other words, when the spindle 330 comes into contact with the workpiece W, the workpiece W is pushed toward the anvil 320 and slides on the placing surface until the workpiece W comes into contact with the anvil 320. Then, when the workpiece W comes into contact with the anvil 320, the movement of the workpiece W is restricted, and the workpiece W is sandwiched between the anvil 320 and the spindle 330. At this time, the workpiece W changes its posture, causing the measuring surface of the anvil 320 and the contact surface of the workpiece W to be in close contact and the measuring surface of the spindle 330 and the contact surface of the workpiece W to be in close contact. In this manner, the workpiece W is not fixed and is allowed to move to some extent on the placing surface, which allows the part to be measured of the workpiece W to be sandwiched between the anvil 320 and the spindle 330 without any gap.

If the friction of the placing surface of the workpiece placing plate 462 is too small, the workpiece W can slip and fall down when placed by the robot hand 140 or a human hand or shift from the orientation or posture in which it was placed, and the placing surface of the workpiece placing plate 462 is desirably machined unevenly to generate some friction with the workpiece W. The placing surface is desirably machined to allow the workpiece W to change its position and posture when a force less than a set measurement pressure (about 1 N to 5 N) acts on the workpiece W while the workpiece is on the placing surface.

The automatic operation unit 500 is described below.

The automatic operation unit 500 automatically controls the forward/backward movement of the spindle 330 (movable element) by the power of a motor (drive device) 520. The automatic operation unit 500 includes a motor housing

510, a motor 520, a power transmission unit 530, and a motor control unit (drive control unit) 600.

The motor housing 510 houses the motor 520 and the motor control unit 600. The motor housing 510 is disposed on an extension of the centerline of the spindle 330 (or the thimble 340) of the micrometer 300. In other words, the automatic operation unit 500 is installed in such a manner that the rotation axis of the rotor of the motor 520 is on the same line as the center axis (measurement axis) of the spindle 330 (or the thimble 340). If necessary, the position of the motor housing 510 may be adjusted by moving the motor housing 510 along the rail of the second short side part 414.

The motor 520 may be a normal electric motor that extracts the rotation of the rotor to the output shaft. However, the motor 520 is preferably able to control the rotation angle (the number of revolutions) of forward and reverse rotation to some extent by control pulses. The motor 520 may have a torque detection function. (Various methods are known for detecting motor torque itself, such as determining torque from the increase or decrease in the applied current (applied voltage).) A stepping motor can be used as the motor 520. (Needless to say, a servo motor or a synchronous motor is also acceptable, and the structure and drive system of the motor 520 are not particularly limited.)

The power transmission unit 530 has a fastening ring 531 that fits onto the thimble 340, a rotating plate 532 provided to rotate in synchronization with the rotation axis of the rotor of the motor 520, and a transmission link rod 533 that connects the fastening ring 531 and the rotating plate 532. One end of the transmission link rod 533 is fixed to the fastening ring 531 and the other end is fixed to the rotating plate 532. The transmission link rod 533 is parallel to the center axis (measurement axis) of the spindle 330. When the rotating plate 532 is rotated by the motor 520, the rotation is transmitted to the fastening ring 531 through the transmission link rod 533, and the fastening ring 531 is rotated in synchronization with the rotating plate 532.

The motor control unit 600 controls the rotational drive of the motor 520 to control the forward/backward movement of the spindle 330.

Specifically, the motor control unit 600 includes an arithmetic unit and a memory device that are constituted by a computer including a central processing unit (CPU), a read-only memory (ROM), and a random access memory (RAM), and a motor drive circuit that generates drive signals (voltage signals or current signals) and applies them to the motor.

Figure 3:
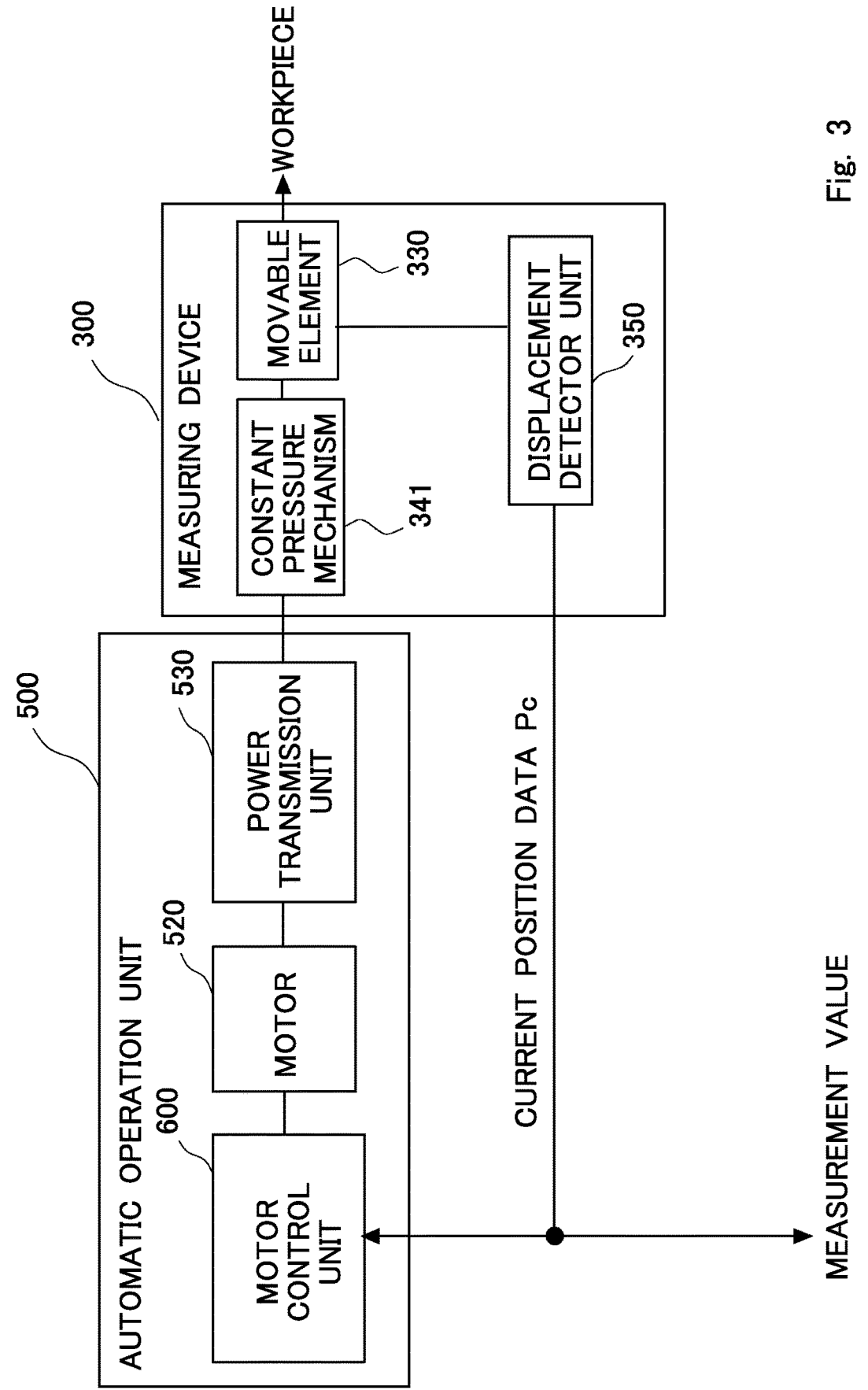
FIG. 3 is a control functional block diagram of the automatic micrometer device.

FIG. 3 is a control functional block diagram in the present embodiment.

The motor control unit 600 drives the motor 520 by a drive command to move the movable element (spindle) of the measuring machine forward and backward, and acquires current position data Pc of the movable element (spindle) detected by the displacement detector unit 350.

The route for transmitting the current position data Pc of the movable element (spindle) from the displacement detector unit 350 to the motor control unit 600 is not specified in FIG. 3, but the digital micrometer (measuring machine) 300 has a function to output the measurement value externally via wired or wireless communication (for example, an output port or a transmission unit), and the output port or transmission unit may be directly connected to the motor control unit 600. Alternatively, if a separate measurement-value-data collection unit is provided to collect measurement values of the micrometer (measuring machine) 300, the motor control unit 600 and the displacement detector unit 350 may be indirectly communicatively connected via the measurement-value-data collection unit.

Figure 4:
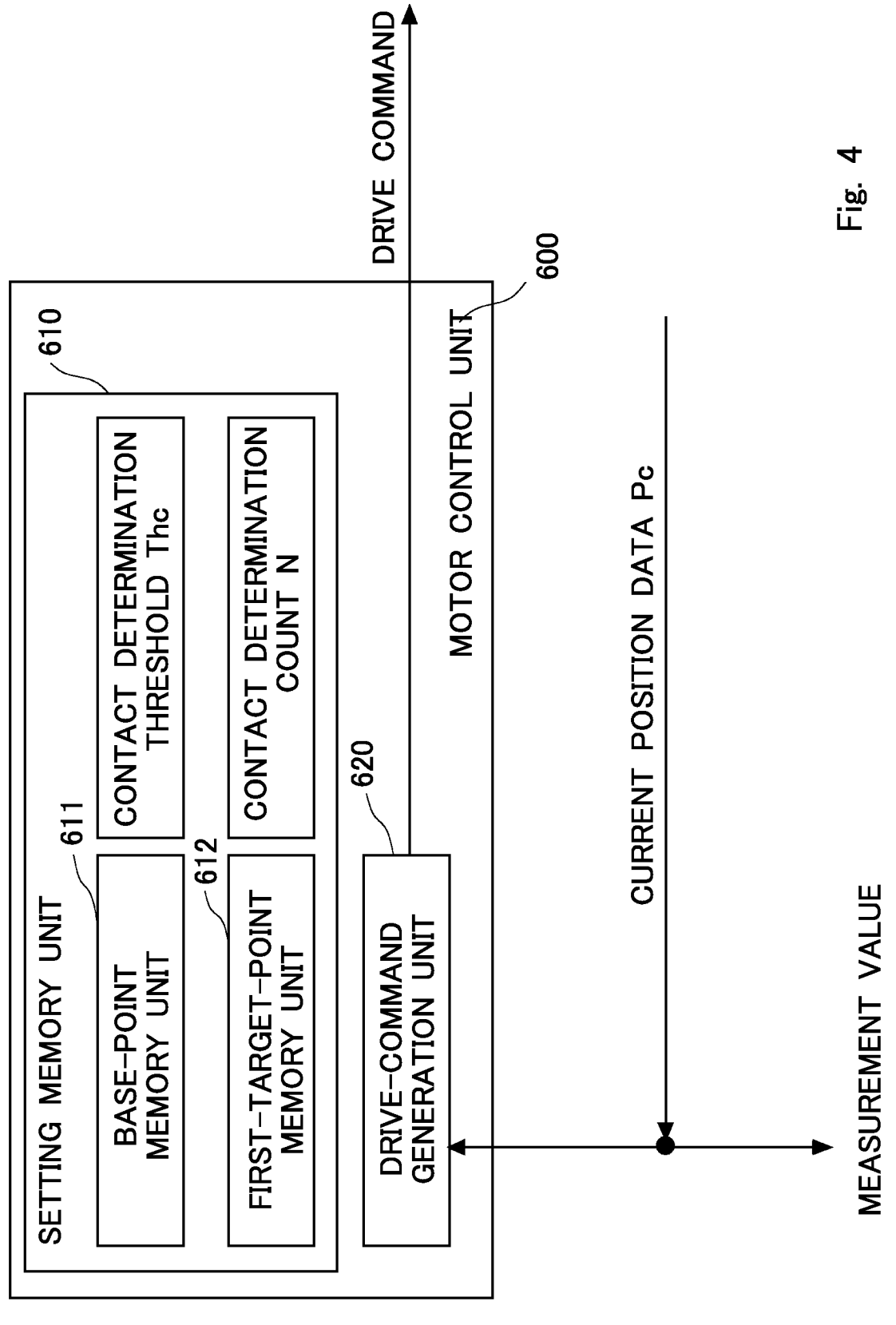
FIG. 4 is a functional block diagram of a motor control unit.

FIG. 4 is a functional block diagram of the motor control unit 600.

The motor control unit 600 includes a setting memory unit 610 and a drive-command generation unit 620. In the setting memory unit 610, a base-point memory unit 611, a first-target-point memory unit 612, a contact determination threshold Thc, and a contact determination count N are set and stored. The function of the motor control unit 600 is described together with the description of operation.

Before starting a measurement operation, preliminary preparations are made by an operator (user).

Figure 7:
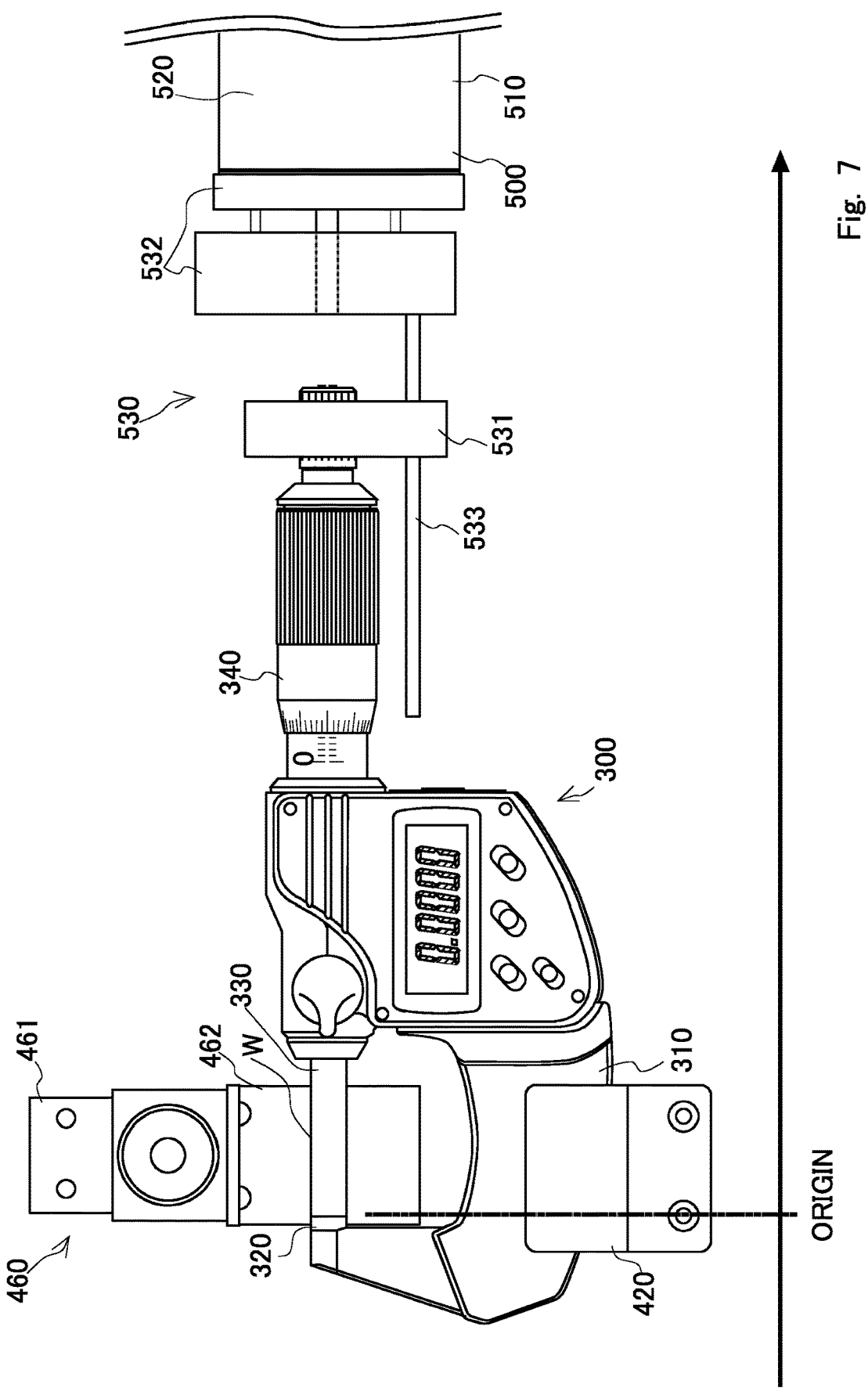
FIG. 7 is a view showing, as an example, that a base point (origin) is being set.

The first preliminary preparation is to calibrate the measuring machine (micrometer 300) and set the base point (origin). Since the measuring machine in the present embodiment is a micrometer, the position of the spindle 330 when the spindle 330 strikes the anvil 320 at a predetermined measurement pressure is used as the origin (base point), as shown in FIG. 7. In this state, the counter of the displacement detector unit (for example, an encoder) 350 built into the measuring machine (micrometer 300) may be reset to zero. In this case, zero is set as the base point (origin) in the base-point memory unit 611 of the motor control unit 600. Alternatively, the counter value representing the position of the spindle 330 when the spindle 330 strikes the anvil 320 at the predetermined measurement pressure may be stored as the origin (base point) in the base-point memory unit 611.

Next, if the dimension is known from information about a workpiece (design data or the like), a first target point Pt1 based on the workpiece dimension is set in the first-target-point memory unit 612. A possible situation in which the automatic measuring device 200 is used is to inspect a workpiece W (for example, a part) machined by a machine tool (for example, an NC lathe) to determine whether the workpiece W is in accordance with the design dimension or within the tolerance range. Since the workpiece dimension and tolerance are known from the design data about the workpiece, the first target point Pt1 is set with a slight margin over the workpiece dimension in order to feed the movable element (spindle 330) at high speed to immediately before the workpiece. If the design dimension of the workpiece is 20 mm and the tolerance is 0.5 mm, the first target point Pt1 may be set at 21 mm by adding the tolerance with a margin of, for example, 0.5 mm to the workpiece dimension to prevent the spindle 330 from pushing into the workpiece at high speed. Naturally, the first target point Pt1 may be set further ahead of the workpiece, but it is desirable that the margin is not too large, considering measurement efficiency (shorter measurement time) and takt time.

The contact determination threshold Thc is a threshold to be used in a contact determination step (ST150). This point is described later.

(Explanation of Operation)

The operation of the automatic micrometer device 200 is described below.

Figure 5:
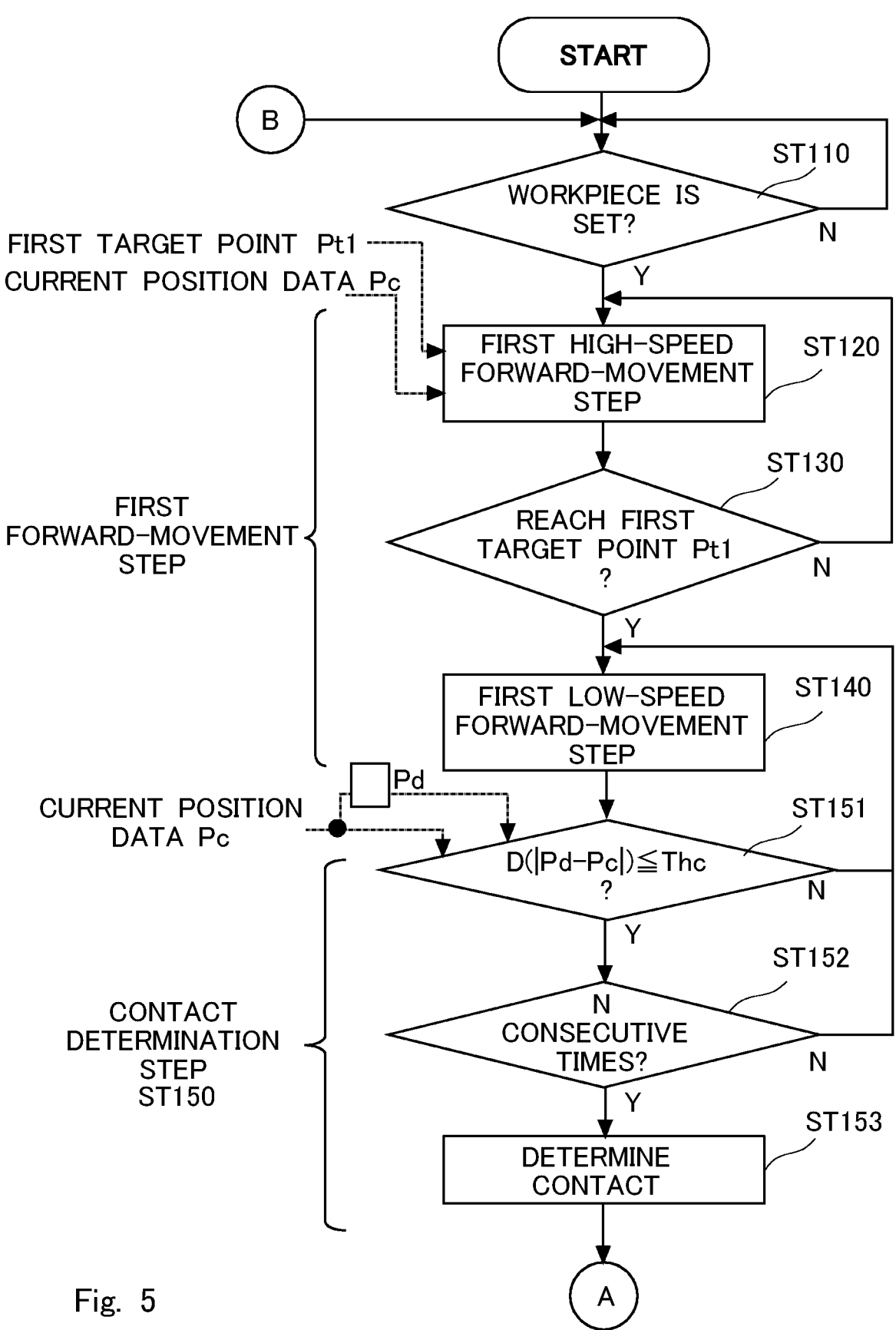
FIG. 5 is a flowchart for explaining a measurement operation of the automatic micrometer device.
Figure 6:
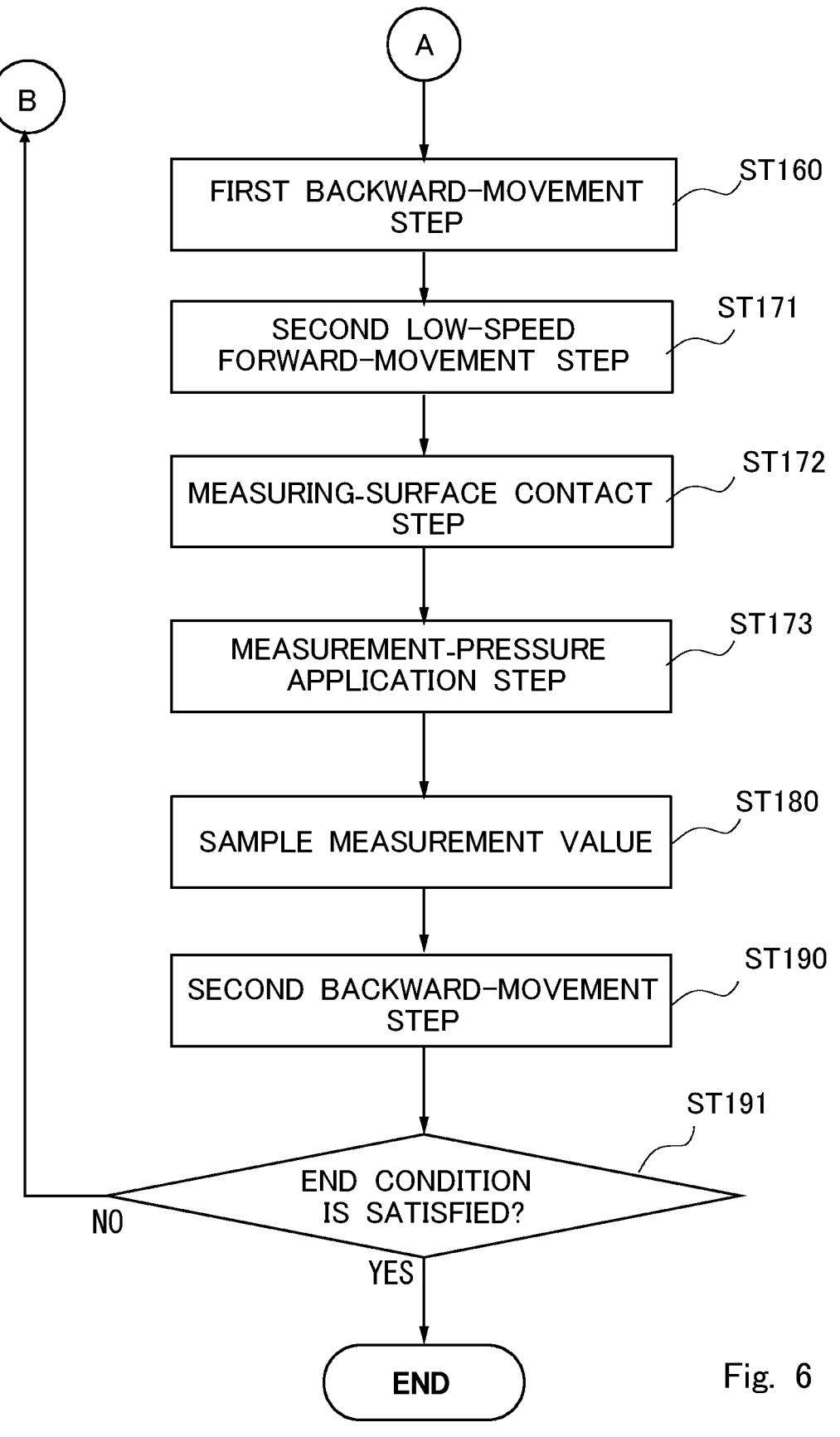
FIG. 6 is a flowchart for explaining the measurement operation of the automatic micrometer device.

FIGS. 5 and 6 are flowcharts for explaining the measurement operation of the automatic micrometer device 200.

Figure 8:
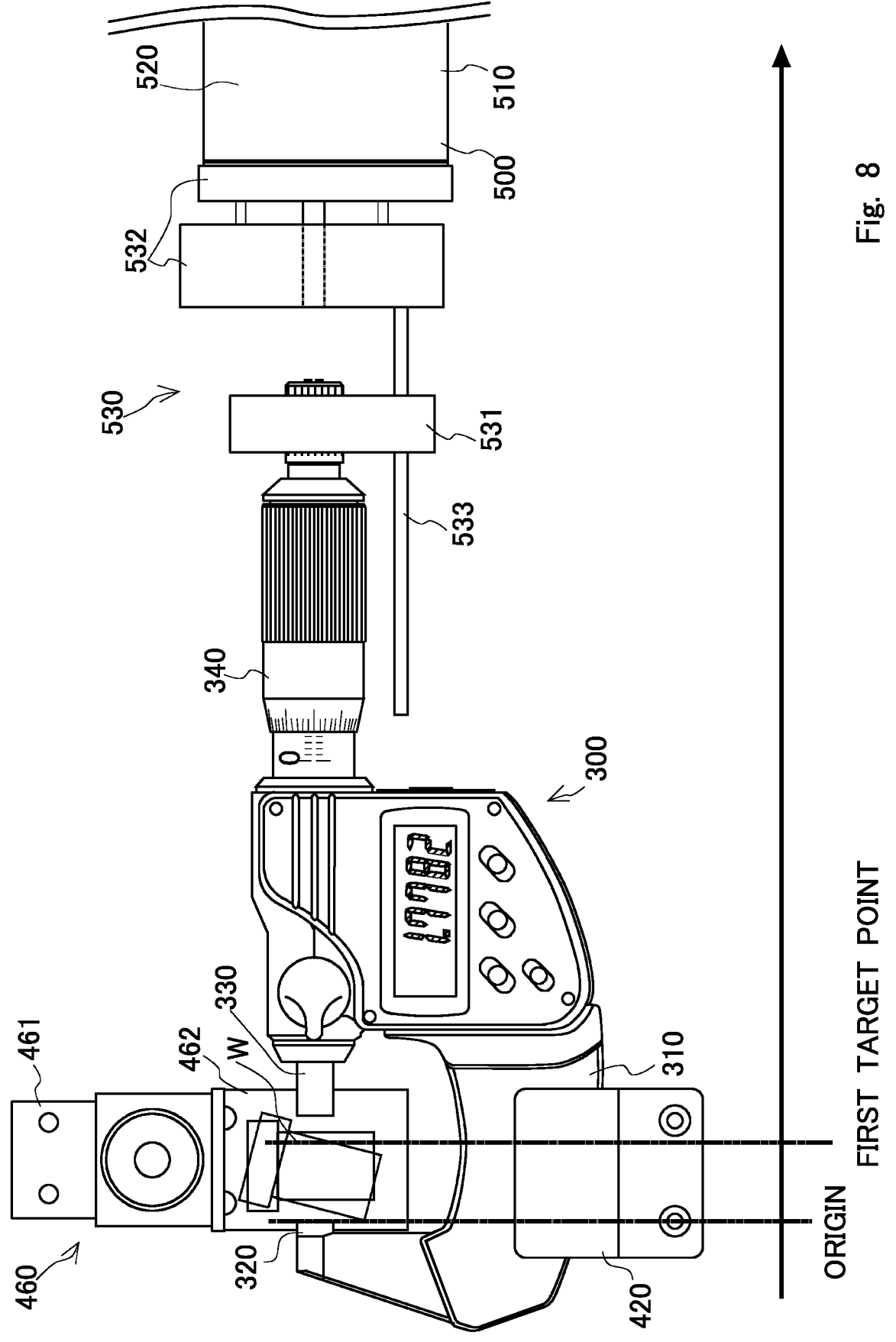
FIG. 8 is a view showing an example of a spindle moving forward.

When detecting that the workpiece W is set on the workpiece placing plate 462 by the robot arm 130 (ST110: YES), the motor control unit 600 performs preset (programmed) motor drive control. First, the motor control unit 600 (drive-command generation unit 620) rotates the motor 520 forward at a relatively high speed to move the spindle 330 forward toward the anvil 320 (a first high-speed forward-movement step (ST120)). The rotational speed of the motor 520 in the first high-speed forward-movement step (ST120) is 180 rpm (or about 100 rpm to 200 rpm). FIG. 8 shows an example of the spindle 330 moving forward.

The workpiece is off the first target point Pt1 or is placed at a slight angle (indicated by the dotted line) in FIG. 8, but this can happen when the robot hand sets (places) one workpiece after another on the workpiece placing plate 462. Although it can also happen that a workpiece protrudes from the first target point Pt1, the workpiece placing plate 462 allows the workpiece to change its position with a force less than the measurement pressure and also allows the workpiece to rotate and change its posture when pushed by the measuring surfaces of the spindle and the anvil. Therefore, even if the spindle comes into contact with the workpiece before the first target point Pt1, the workpiece is not damaged.

In the first high-speed forward-movement step (ST120), the drive-command generation unit 620 compares the first target point Pt1 with the current position data Pc of the spindle 330 fed back from the displacement detector unit 350, and gives a drive command to the motor 520 to move the spindle forward at high speed (coarse movement) until the current position Pc of the spindle reaches the first target point Pt1. When the current position Pc of the spindle reaches the first target point Pt1 (ST130: YES), the drive-command generation unit 620 switches the movement mode of the spindle 330 from high speed (coarse movement) to low speed (fine movement) (ST140).

In a first low-speed forward-movement step (ST140), the low speed (fine movement) is, for example, 9 rpm. If the displacement per revolution of the spindle 330 is, for example, 0.5 mm, the low-speed (fine movement) forward movement is equivalent to 4.5 mm/min (0.075 mm/sec).

Note that the first high-speed forward-movement step ST120 and the first low-speed forward-movement step ST140 constitute a first forward-movement step in which the movable element (spindle) is moved forward to bring the movable element (spindle) into contact with the workpiece.

In the first low-speed forward-movement step (ST140), the drive-command generation unit 620 gives a drive command to the motor 520 to move the spindle 330 forward at a low speed. Then, in the first low-speed forward-movement step (ST140), the drive-command generation unit 620 calculates a difference D (=|Pd−Pc|) between the current position data Pc of the spindle 330, which is fed back from the displacement detector unit 350, and position data Pd of the spindle 330 in the previous control cycle, and compares the difference D with the contact determination threshold Thc.

Here, the contact determination threshold Thc is a threshold for determining whether the movable element (spindle) has been brought into contact with the workpiece. The contact determination threshold Thc is preset in the setting memory unit 610 of the motor control unit 600. When the displacement D of the movable element (spindle) in one control cycle, which can be rephrased as a sampling cycle time of position information or a cycle time of contact determination, becomes equal to or less than the contact determination threshold Thc (contact determination threshold Thc≥difference D(=|Pd−Pc|)) for a predetermined number of consecutive times, the drive-command generation unit 620 determines that the movable element (spindle) has been brought into contact with the workpiece.

Figure 9:
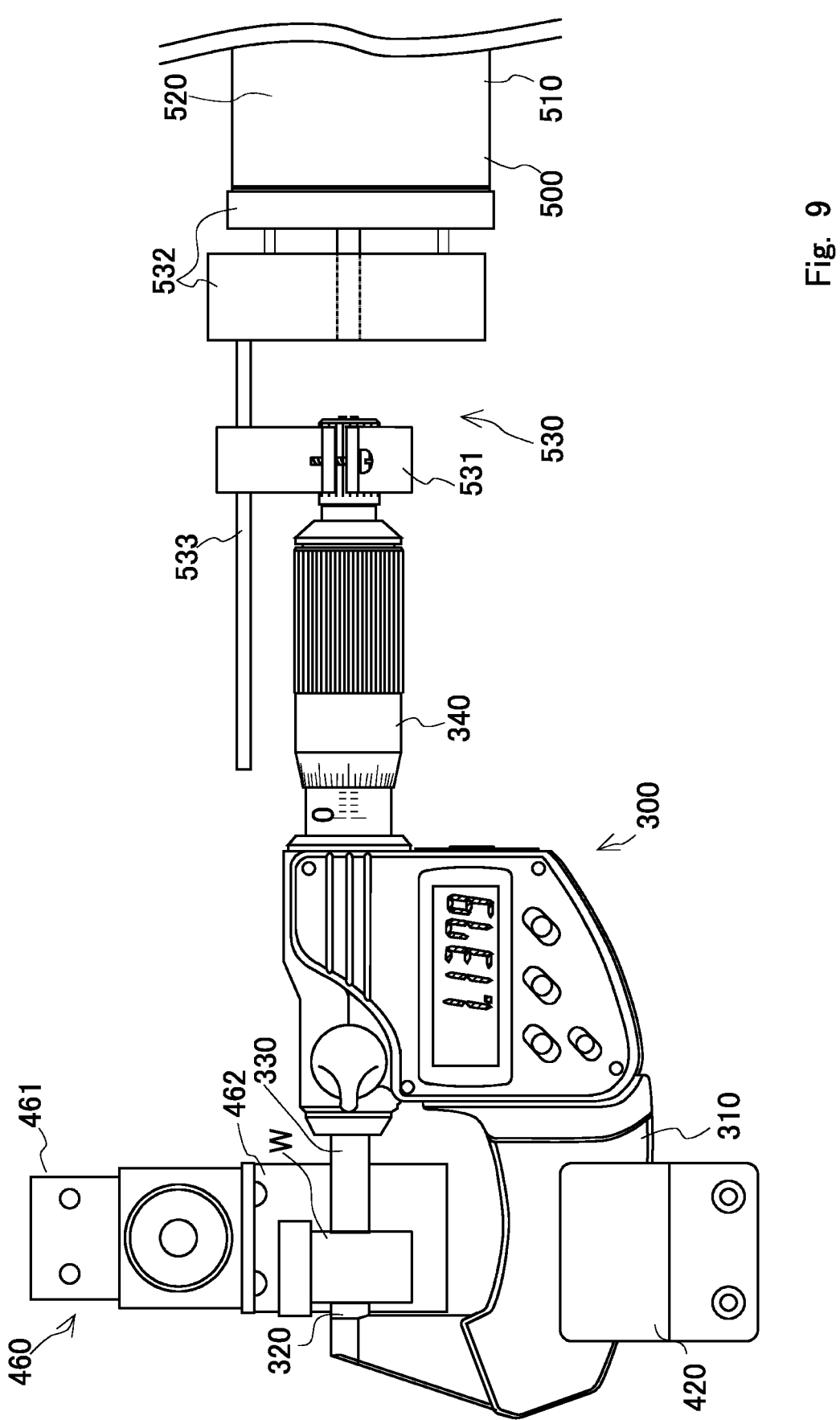
FIG. 9 is a view showing an example of a workpiece being held between a spindle and an anvil.

As shown in FIG. 9, it is assumed that the spindle is moved forward and the workpiece W is held between the spindle 330 and the anvil 320. If the spindle 330 is moved forward further from this state, the contact pressure between the workpiece W and the spindle 330 increases and a reaction force is applied to the spindle 330. Then, the constant pressure mechanism 341 is activated and the power from the motor 520 is no longer transmitted to the spindle 330, and the forward movement of the spindle 330 stops.

Therefore, when determining that the difference D(=|Pd−Pc|) is equal to or less than the contact determination threshold Thc (contact determination threshold Thc≥difference D(=|Pd−Pc|)) (ST151: YES), and confirming this N consecutive times (for example, 4 times) (ST152), the drive-command generation unit 620 determines that the spindle 330 has been brought into contact with the workpiece W (ST153).

The contact determination threshold Thc is, for example, 0.001 mm. If the contact determination threshold Thc is too large, contact between the spindle 330 and the workpiece W can be falsely detected before the constant pressure mechanism 341 is activated (before the spindle and the workpiece are securely in contact). On the other hand, if the contact determination threshold Thc is too small (zero in the extreme case), contact between the spindle and the workpiece cannot be detected indefinitely. (The present invention does not deny setting the contact determination threshold Thc to zero.) Since the minimum indicated value is 0.0001 mm in the present embodiment and 0.0001 mm can be guaranteed as the detection resolution of a displacement detector, the contact determination threshold Thc can be set to 0.0001 mm.

The contact determination count N is preset in the setting memory unit 610. The contact determination count N is, for example, a natural number greater than or equal to 1.

The contact determination count N is, for example, 4 times. If the contact determination count N is too large, it takes time to determine contact. On the other hand, if the contact determination count N is too small, erroneous determination of contact increases. The contact determination threshold Thc and the contact determination count N are only required to be set to appropriate values that can determine that the forward movement of the spindle (movable element) 330 has stopped by the activation of the constant pressure mechanism, and appropriate values are set in terms of the size, dimension, and tolerance of the workpiece W, accuracy of the measuring machine (minimum display quantity), tact time, and prevention of false detection.

Although N consecutive times (4 times) is used here, contact may be determined if the contact determination in ST151 is YES N times (4 times), even if it is not consecutive.

When determining that the spindle 330 has been brought into contact with the workpiece W (ST153), the drive-command generation unit 620 immediately rotates the motor 520 reversely for a predetermined number of revolutions at a relatively high speed to move the spindle 330 backward (a first backward-movement step ST160). The rotational speed of the reverse rotation is 180 rpm. The number of revolutions of the reverse rotation is, for example, 0.5 rpm. This rotational speed (180 rpm) is an example and the rotational speed in the forward movement (ST120) and the rotational speed in the backward movement (ST160) may be the same or different.

Here, the spindle 330 is not "stopped" or "slowed down", but is desirably moved backward once with a relatively fast reverse rotation.

This ensures that the spindle 330 does not dig into the workpiece W. Transmitting a control signal to move the spindle 330 backward once rather than simply stopping the spindle 330 ensures that the spindle 330 does not dig into the workpiece W. Although the spindle 330 is in contact with the workpiece W to activate the constant pressure mechanism 341 by the first forward-movement step (ST140), the contact pressure between the spindle 330 and the workpiece W is not always the proper measurement pressure, and the spindle 330 can push too much into the workpiece W or, conversely, the contact can be weak. This is because the forward movement of the spindle 330 by the first low-speed forward-movement step (ST140) not only brings the spindle 330 into contact with the workpiece W, but also adjusts the position and posture of the workpiece W. Therefore, in the first contact between the spindle 330 and the workpiece W, the contact surfaces between the spindle and the workpiece cannot be properly close together or can be pushed in too far. In a subsequent step, the constant pressure mechanism is to be activated again to generate the measurement pressure. However, in order to properly adjust the position or posture of the workpiece W and to generate the proper measurement pressure, it is necessary to first release (or weaken) the contact between the spindle 330 and the workpiece W and to activate the constant pressure mechanism while the spindle 330 is constantly moved forward at the same speed. This allows the same operation of applying the measurement pressure to the workpiece W at all times, thus enabling stable automatic measurement. Then, as the first backward-movement step (ST160), the spindle 330 is once moved backward to secure the operating distance of the spindle 330.

Next, the motor 520 is rotated forward at a relatively low speed to move the spindle 330 forward toward the anvil 320 (ST171, ST172). As a second low-speed forward-movement step (ST171), the motor 520 is rotated forward at a relatively low speed. The number of revolutions is the same as that in the previous backward movement (ST160). Here, 0.5 revolutions at 9 rpm are used. This ensures the contact between the workpiece W and the anvil 320 and the contact between the workpiece W and the spindle 330 while the workpiece W is slowly pushed.

Then, as a measuring-surface contact step (ST172), the motor 520 is rotated forward at a relatively low speed (ST172). The number of revolutions is assumed to be, for example, equivalent to the number of revolutions of the thimble 340 (the number of revolutions of the spindle 330) corresponding to the time from when the workpiece W comes into contact with the anvil 320 and the spindle 330 until the constant pressure mechanism 341 is activated. Here, 0.5 revolutions at 9 rpm are used. (This is the same as ST171, but the rotational speed and the number of revolutions may be changed as needed.) Here, once the constant pressure mechanism 341 is slowly activated, the contact surfaces between the workpiece W and the anvil 320, and the contact surfaces between the workpiece W and the spindle 330 are securely fitted with each other (brought close together).

Now, the workpiece W is firmly sandwiched between the anvil 320 and the spindle 330 in this state. Then, as a measurement-pressure application step (ST173), the motor 520 is driven to rotate in the forward direction at a relatively high speed. For example, the motor 520 is rotated three times at 180 rpm. At this time, the constant pressure mechanism 341 is activated again, and the predetermined measurement pressure is applied.

The motor rotational speed in this step (ST173) may be higher (for example, 150 rpm to 250 rpm). Since the contact surfaces between the workpiece W and the spindle 330 have been fitted with each other in the previous step (ST172), the contact surfaces between the spindle 330 (anvil 320) and the workpiece W are now firmly fitted with each other. Therefore, it is unlikely that the spindle 330 (anvil 320) digs into the workpiece W. The number of revolutions in this step (ST173) is the number of revolutions required to activate the constant pressure mechanism 341, which is about 1.5 to 3.5 revolutions and depends on the specifications of the microm- eter (constant pressure mechanism) to be used.

The micrometer 300 samples a measurement value (ST180) once the constant pressure mechanism 341 is activated in the measurement-pressure application step (ST173) (or at the moment the constant pressure mechanism 341 is activated in the measurement-pressure application step (ST173)). The sampled measurement value (measure- ment data) is output externally via wired or wireless com- munication, and the measurement data is collected and processed by an external personal computer (PC) or a data processing device.

Here, the second low-speed forward-movement step (ST171) and the measuring-surface contact step (ST172) may be interpreted as corresponding to a re-forward-move- ment step, or the second low-speed forward-movement step (ST171), the measuring-surface contact step (ST172), and the measurement-pressure application step (ST173) may be interpreted as corresponding to the re-forward-movement step.

Up to this point, one measurement value has been acquired, the motor control unit 600 (drive-command gen- eration unit 620) rotates the motor 520 in reverse at a relatively high speed to move the spindle 330 backward (a second backward-movement step ST190). This measure- ment operation is continued while replacing the workpiece W until an end condition is satisfied (ST191: YES).

With the automatic measurement system 100 according to the present embodiment, it is possible to almost automate the measurement operation for the workpiece W. The automatic micrometer device 200 according to the present embodiment automates the micrometer 300, which is a small-sized mea- suring machine (small-sized measuring tool). Since it is expected that a typical factory already has the micrometer 300, automation of the micrometer 300 can be achieved simply by preparing the measuring-machine supporting base part 400, the workpiece holding base part 460, and the automatic operation unit 500. In other words, the cost required to introduce automatic measurement can be kept extremely low, which contributes greatly to reducing labor shortages.

The micrometer 300 is a contact type and has extremely high measurement stability. In addition, the micrometer 300 has a long history and is widely used in the world, making it the most familiar measuring machine for measurement operators. Therefore, operators are fully familiar with the necessary handling of the micrometer 300, such as calibra- tion work, and there is almost no need to learn or train difficult work procedures.

Various automatic measuring devices have been proposed in the past, but most of them used non-contact measuring tools. For example, many of them used air micrometers, laser scan micrometers, or the like. However, such non- contact measurement devices are extremely expensive and somewhat difficult to maintain. In this respect, the automatic micrometer device 200 according to the present embodiment that can automate the micrometer 300 has the advantage of being inexpensive and easy to handle.

One of the reasons why it has been difficult to automate the micrometer 300, which is a representative of small-sized measuring machines (small-sized measuring tools), is that it was difficult to properly sandwich the workpiece W from both sides and fit the contact surfaces (measuring surfaces)

with each other. In this respect, the relative position between the workpiece W and the micrometer 300 is not fixed in the present embodiment, and the position and posture can be changed by a force lower than the measurement pressure.

In addition, the constant pressure mechanism 341 in the micrometer 300 and the position detection of the displace- ment detector unit 350 (for example, an encoder) are com- prehensively used to move the spindle 330 forward and backward in several steps. In particular, in the contact determination step (ST150) of determining whether the spindle 330 has been brought into first contact with the workpiece W, the position data fed back from the displace- ment detector unit 350 is used to determine whether the spindle 330 is stopped by the activation of the constant pressure mechanism 341. For example, although it is pos- sible to detect that the spindle has been brought into contact with the workpiece from the increase or decrease in motor torque (or motor current), the contact determination thresh- old needs to be adjusted for each individual motor (for each automatic measuring device) because motors have large individual differences. In addition, the motor current increases or decreases to some extent even when the motor is driven normally, and the motor torque (motor current) can increase at the beginning of movement or to change the direction.

Therefore, in order to detect contact from motor torque (or motor current), it is necessary to adjust the threshold deli- cately. In addition, if the threshold is not set properly, there is a concern that malfunctions can occur, such as the spindle 330 moving backward before coming into contact with the workpiece W due to erroneous determination of contact between the spindle 330 and the workpiece W, or the contact not being detected for a long time. In this regard, since the displacement detector of the micrometer (measuring machine) is calibrated before measurement, there are no individual differences in spindle position data among mea- suring machines, and there is no need to adjust the threshold settings for contact detection to match the actual one for each measuring machine. In an extreme case, the manufac- turer's default settings (for example, a motor drive control program prepared in advance) can be used directly.

Figure 10:
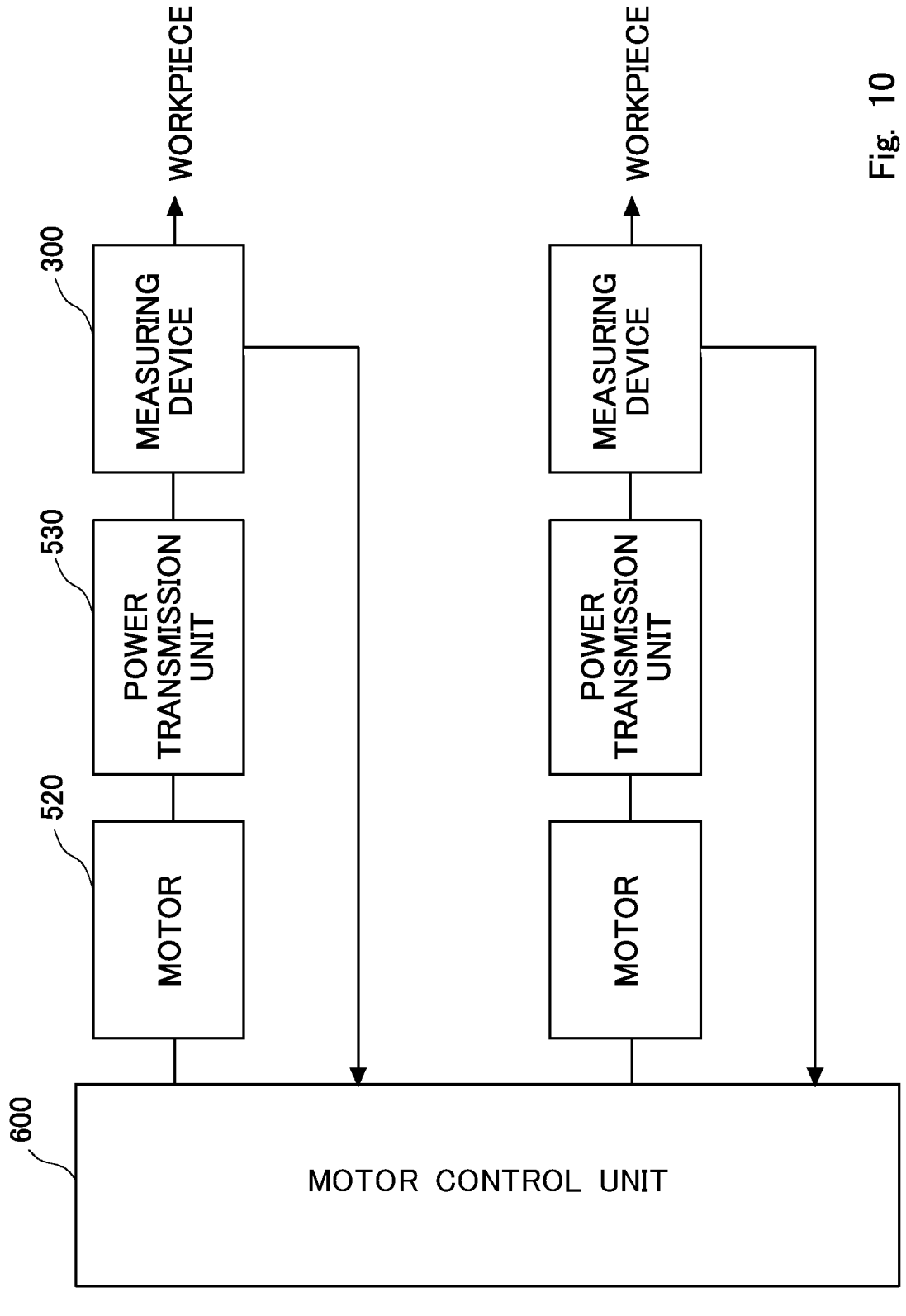
FIG. 10 is an example of a configuration in which a motor control unit is shared by multiple automatic measuring devices.

This makes it easy to configure the motor control unit to have multiple channels and to share the motor control unit (drive control unit) with multiple automatic measuring devices, as illustrated in FIG. 10.

The present invention is not limited to the above embodi- ment and can be appropriately modified without departing from the gist.

In the above embodiment, the outer dimension of the workpiece W is measured with a micrometer, but the inner or outer diameter of the workpiece W may be automatically measured with an internal diameter measuring machine or a caliper.

In the above embodiment, the workpiece W is placed on the workpiece placing plate 462, but the workpiece W may be gripped (grasped). In this case, a workpiece grasping means may be attached to and supported by the workpiece holding base part 460 via a floating joint that allows parallel movement, such as a parallel plate spring. Alternatively, the workpiece grasping means may be a robot arm. (In this case, the robot arm or robot hand as the workpiece grasping means may have a floating joint that allows parallel movement, such as a parallel plate spring.) Naturally, instead of the workpiece grasping means, the measuring-machine support- ing base part 400 may allow parallel movement, in which case, the measuring-machine holding unit 420 may be attached to the base frame 410 via a floating joint. The direction of parallel movement to be allowed is at least parallel to the forward/backward movement direction of the spindle 330 (axial direction of the spindle 330). If a slight degree of freedom of rotational is also needed for the contact surfaces between the spindle 330 (anvil) and the workpiece W to be fitted with each other, a rotation axis may be provided, or the orientation (posture) may be allowed to change by, for example, the elasticity of a plate spring.

In the above embodiment, the operation of measuring the workpiece W is described as an example. The same operation can also be used to set a base point and to perform calibration using a gauge block.

If the information about the workpiece W (workpiece dimension) is known in advance, it is preferable to set the first target point Pt1 and perform the first high-speed forward-movement step (ST120). If the workpiece dimension is not known, the first forward-movement step is only required to start with the low-speed forward-movement step (ST140) without performing the first high-speed forward-movement step (ST120) based on the first target point Pt1.

In the above embodiment, after the contact determination (ST153), the movable element (spindle) is moved backward once (ST160), and the movable element (spindle) is then moved forward by a predetermined amount (for example, 0.5 revolutions) in the second low-speed forward-movement step ST171. However, in the second low-speed forward-movement step ST171, the movable element (spindle) may be moved forward until the contact can be determined in the contact determination step (ST150) once again. Even if the movable element (spindle) has not been brought into contact with the workpiece in the first forward-movement step (first low-speed forward-movement step ST140), the movable element (spindle) is reliably brought into contact with the workpiece by trying again.

In the above embodiment, after the contact determination (ST153), the movable element (spindle) is moved backward once (ST160) and then moved forward again to apply the measurement pressure before the measurement value is sampled (ST180). However, after the contact determination (ST153), the moving the movable element (spindle) backward once (ST160) and forward again (ST171 to 173) can be skipped in some cases, and the measurement value can be sampled after the contact determination (ST153). Such steps can be selected and skipped as appropriate, taking into consideration the type, size, dimension, and tolerance of the workpiece, accuracy of the measuring machine, tact time, and other factors.

REFERENCE SIGNS LIST

100 Automatic measurement system,
110 Belt conveyor,
120 Stocker,
130 Articulated robot arm,
140 Robot hand,
150 Camera,
200 Automatic micrometer device (automatic measuring device),
300 Micrometer (measuring machine),
310 U-shaped frame (fixed element),
320 Anvil,
330 Spindle (movable element),
340 Thimble,
350 Displacement detector unit,
400 measuring-machine supporting base part,
410 Base frame,
411 First long side part,

412 Second long side part,
413 First short side part,
414 Second short side part,
420 Measuring-machine holding unit,
460 Workpiece holding base part,
461 Supporting column,
462 Workpiece placing plate
500 Automatic operation unit,
510 Motor housing,
520 Motor (drive device),
530 Power transmission unit,
531 Fastening ring,
532 Rotating plate,
533 Transmission link rod,
600 Motor control unit,
610 Setting memory unit,
620 Drive-command generation unit.

The invention claimed is:

1. A control method of an automatic measuring device comprising:

a measuring machine including a movable element provided to be displaceable with respect to a fixed element and configured to move forward and backward to be brought into contact with or away from a workpiece to measure a dimension of the workpiece, and a displacement detector unit, including at least an encoder, or a camera to read an analog-type scale, configured to detect displacement of the movable element; and an automatic operation unit configured to automate the forward and backward movement of the movable element by power, the automatic measuring device being configured to automatically measure the workpiece using the measuring machine, the control method comprising:

a first forward-movement step of moving, by the automatic operation unit, the movable element forward to bring the movable element into contact with the workpiece; and a contact determination step of determining the contact between the movable element and the workpiece in the first forward-movement step by determining at least that a change in a position of the movable element, detected by the encoder, or the camera reading the analog-type scale, in the displacement detector unit in the first forward-movement step, becomes equal to or less than a predetermined contact determination threshold.

2. The control method of the automatic measuring device according to claim 1, the control method further comprising:

a first backward-movement step of moving, by the automatic operation unit, the movable element backward by a predetermined amount when the movable element is determined to be in contact with the workpiece in the contact determination step; and a re-forward-movement step of moving, by the automatic operation unit, the movable element forward again to generate a predetermined measurement pressure between the workpiece and the movable element.

3. The control method of the automatic measuring device according to claim 1, wherein the automatic measuring device further comprises a constant pressure mechanism in a path through which the power is transmitted from the automatic operation unit to the movable element to prevent a force equal to or greater than a predetermined load from being applied from the movable element to the workpiece when a preset load is applied to the movable element, and the movable element is determined to be in contact with the workpiece in the contact determination step when the forward movement of the movable element is stopped by activation of the constant pressure mechanism in the first forward-movement step and the change in the position of the movable element detected by the displacement detector unit becomes equal to or less than the contact determination threshold.

4. The control method of the automatic measuring device according to claim 1, wherein the movable element and the workpiece are determined to be in contact in the contact determination step when the change in the position of the movable element detected by the displacement detector unit in the first forward-movement step becoming equal to or less than the contact determination threshold is confirmed a plurality of consecutive times.

5. The control method of the automatic measuring device according to claim 1, wherein a first target point is set with a slight margin over a workpiece dimension based on information about the workpiece, and the first forward-movement step includes:

a first high-speed forward-movement step of moving the movable element at a relatively high speed to the first target point; and a first low-speed forward-movement step of moving the movable element at a speed lower than the speed in the first high-speed forward-movement step after the movable element reaches the first target point.

6. The control method of the automatic measuring device according to claim 1, wherein the automatic measuring device further comprises a holding unit configured to hold at least one of the workpiece and the measuring machine to bring a contact surface of the workpiece and a contact surface of the movable element into close contact by changing a relative position and posture between the workpiece and the movable element with a pressure equal to or less than a predetermined measurement pressure preset in the measuring machine when the workpiece and the movable element are brought into contact with each other, and the holding unit is configured to allow the workpiece and the measuring machine to change the relative posture in the first forward-movement step, using a direction intersecting a measuring axis of the measuring machine as a rotation axis.

7. An automatic measuring device comprising:

a measuring machine including a movable element provided to be displaceable with respect to a fixed element and configured to move forward and backward to be brought into contact with or away from a workpiece, and a displacement detector unit, including at least an encoder, or a camera to read an analog-type scale, configured to detect displacement of the movable element; and an automatic operation unit configured to automate the forward and backward movement of the movable element by power, the automatic measuring device being configured to automatically measure the workpiece using the measuring machine, wherein the automatic operation unit is configured to perform:

a first forward-movement step of moving the movable element forward to bring the movable element into contact with the workpiece;

a contact determination step of determining the contact between the movable element and the workpiece in the first forward-movement step by determining at least that a change in a position of the movable element, detected by the encoder, or the camera reading the analog-type scale, in the displacement detector unit in the first forward-movement step, becomes equal to or less than a predetermined contact determination threshold;

a first backward-movement step of moving the movable element backward by a predetermined amount when the movable element is determined to be in contact with the workpiece in the contact determination step; and a re-forward-movement step of moving the movable element forward again to generate a predetermined measurement pressure between the workpiece and the movable element.

\* \* \* \* \*